United States Patent [19]

Kühl et al.

[11] Patent Number: 4,511,118
[45] Date of Patent: Apr. 16, 1985

[54] ELECTROMAGNETIC BALL VALVE

[75] Inventors: Uwe Kühl, Mustin; Andreas Krause, Lubeck; Horst Krüger, Stockelsdorf, all of Fed. Rep. of Germany

[73] Assignee: Drägerwerk Aktiengesellschaft, Fed. Rep. of Germany

[21] Appl. No.: 488,263

[22] Filed: Apr. 25, 1983

[30] Foreign Application Priority Data

Aug. 21, 1982 [DE] Fed. Rep. of Germany ....... 3231172

[51] Int. Cl.³ .............................................. F16K 31/02
[52] U.S. Cl. ................................. 251/137; 251/139; 251/141
[58] Field of Search ........................ 251/137, 139, 141; 137/625.65; 126/450

[56] References Cited

U.S. PATENT DOCUMENTS

| 2,366,412 | 1/1945 | Lambert | 251/137 |
| 4,308,890 | 1/1982 | Saito | 251/141 |
| 4,347,836 | 9/1982 | Frank | 126/450 |

Primary Examiner—Samuel Scott
Assistant Examiner—G. Anderson
Attorney, Agent, or Firm—McGlew and Tuttle

[57] ABSTRACT

An electromagnetic ball valve for a flow medium under pressure such as a respirating gas for a respirator which must be adapted to use with a respirator which operates at a high frequency in the range of fifty times the usual frequency. Such ball valve must be employed in the breathing gas supply so as to open and close the supply path and a small volume of gas internal of this apparatus permits this control. The electromagnetically ball valve is arranged with the electromagnetic pole pieces in a sheath and the pole pieces include a flow passage in which a ball moves between a seat and an abutment under the control of a separate electromagnetically controlled pole piece. The seat is cooperative with the ball valve with one connection for the flow medium and the abutment includes a connection for the space around the ball valve under another flow connection. With a delivery side connection through the space around the ball and with a seal on the seat it acts as a NC valve. With a delivery side connection through the seat against the ball and hence contact on the abutment it operates as a NO valve. Two magnetic coils around the respective pole pieces one having the seat and the other having the abutment move the ball into the desired end position and make remanences ineffective.

4 Claims, 1 Drawing Figure

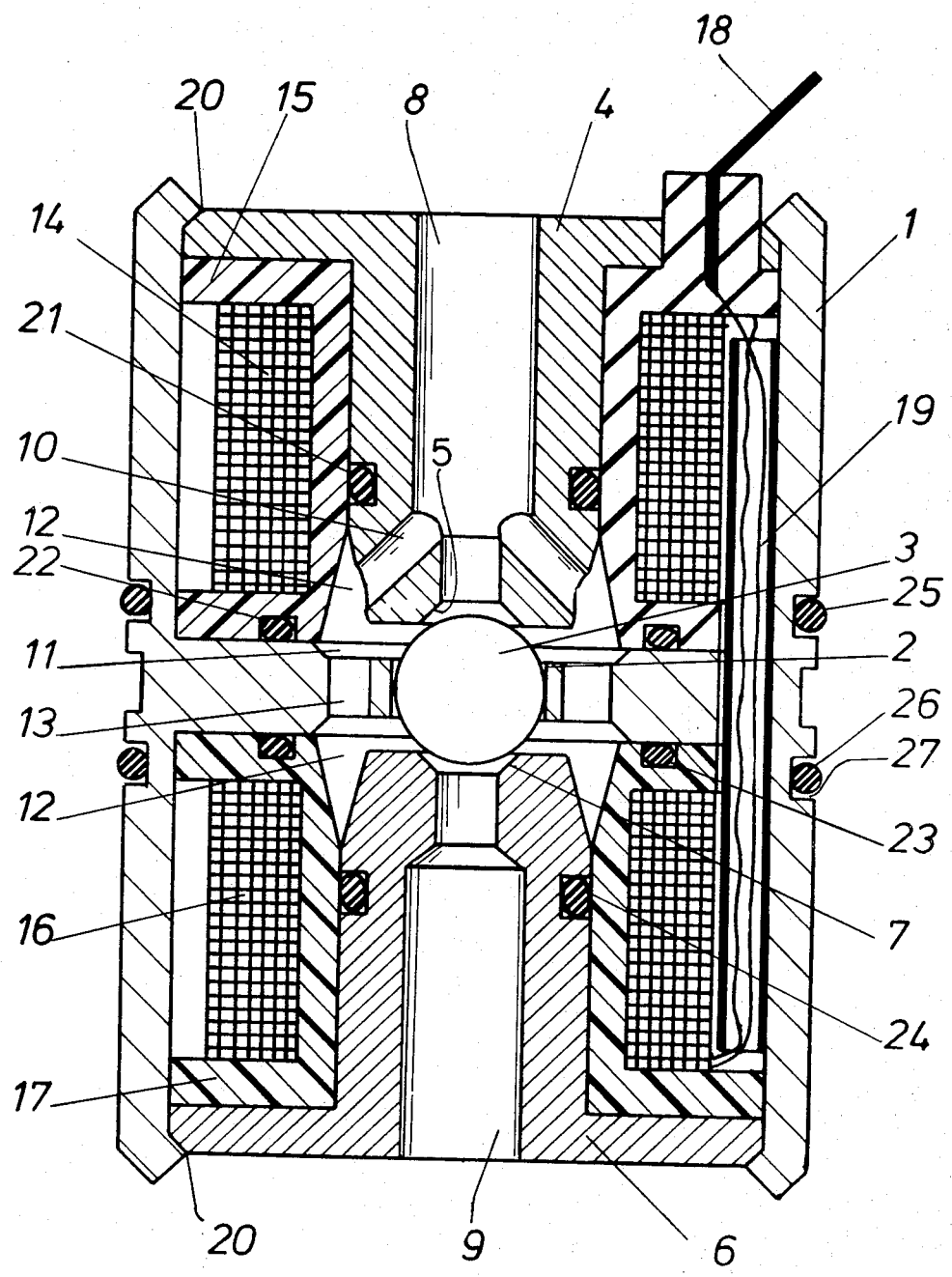

ELECTROMAGNETIC BALL VALVE

FIELD AND BACKGROUND OF THE INVENTION

This invention relates in general to flow control devices for respirators and in particular to a new and useful electromagnetic ball valve for a flow medium under pressure.

Magnet valves operating with a ball are known in numerous designs. They exist in an NC design, closed on the delivery side, and in an NO design, open on the delivery side. In the technical realization they must cope with the following problems:

(a) When the control is switched off, the ball must be pushed by the pressure into the other position. The dynamic behavior (the switching frequency) diminishes with decreasing pressure.

(b) Despite circuit design measures, with opposing currents being briefly generated in the coil in the final control, a magnetic remanance is unavoidable. The fact that the ball must be designed for wear resistant (hardness) is a factor here. For pressures 0.5 atm abs opening in NO valves and closing in NC valves is no longer ensured.

The difficulties (a) and (b) apply also to:

the following known NC valve. The valve consists of a tubular housing with the connections for the medium to be transported brought out laterally. The housing contains a seat for a ball. The ball is mounted on the seat in the interior of the electromagnet. The electromagnet with the ball and the seat is covered by a plate in such a way that the medium sweeps them for cooling reasons. In order that this will actually happen, the valve opens, that is, lifts the ball, when an electric current flows. (German AS No. 13 00 749).

and to the also known NO valve. It comprises a housing of magnetic material, one part of which forms the jacket and the core of an electromagnet with the winding. The core contains a feed channel originating from the connection piece. At the mount of the feed channel, a valve seat for a ball forming the closure piece is arranged in the interior of the core. The ball is mounted in a space (chamber) which is disposed in a cover of magnetic material adapted to the jacket, the cover forming the second part of the housing. The space is to ensure at the same time the guidance of the ball in the axis of the valve seat, so that drain channels form around the ball. Behind the ball an abutment is provided in this space. When the winding of the electromagnet is currentless, the medium flowing in through the feed channel pushes the ball against the abutment and flows past the ball out of the housing through drain channels. Through the energized electromagnet the ball is attracted and thereby pressed onto the valve seat. The ball can be pulled into its closing position by a magnetizing current pulse and can be moved into the open position by a demagnetizing current pulse of opposite direction (German AS 15 00 223).

SUMMARY OF THE INVENTION

The invention provides an axially passing Open/-Close valve in the form of an electromagnetic ball valve which has both NC and NO character and does not have the difficulties mentioned under (a) and (b) above.

According to the invention the ball in a sheath is moved in a guideway between a seat at a lower pole, in which the seat is connected with one connection via a lower bore, and an abutment at an upper pole. A space is formed around the ball outside the seat and it is connected through bores and an upper bore in the upper pole with the other connection. In the sheath an upper magnet coil is arranged on an upper coil support around the lower pole, the elements being held by flanges.

To be able to assemble the electromagnetic ball valve of the invention easily and also to install it easily, the space is sealed by seal rings from the poles as well as from the coil supports, and the sheath contains seal rings at the outer circumference in grooves.

An advantage achieved with the invention is that an electromagnetic ball valve can be assembled easily from few different structural elements. The selection for the use is substantially facilitated by the fact that the magnet coils are safely separated from the medium to be conveyed and therefore fire hazard need not be taken into consideration. It permits use both as NC and an NO valve. Stock keeping both after manufacture and at the consumer can therefore be kept low in a very economical manner. For the alternate use it suffices to select the delivery side connection accordingly. No additional changes or adjustments are necessary.

By simple changes at the sheath, with the opening of the space around the ball as a center connection to the outside, and with the exchange of the upper pole for another lower pole, a change valve can be created.

Accordingly it is an object of the invention to provide an electromagnetic ball valve for a flow medium under pressure which comprises an exterior cylindrical sheath having an opening at each end and with upper and lower pole pieces supported within the sheath each having an axially aligned bore opened at their outer ends and spaced apart at their inner ends within the sheath to as to define a ball guideway therebetween, with an abutment being defined at the lower end of the upper pole bore and a seat being defined at the upper end of the lower pole bore arranged opposite to the abutment and with the ball positioned in the guideway between the bores, the guideway defining a space around the ball and the upper pole bore having a communication passage between it and the space, the upper and lower pole pieces each having an electromagnetic coil therearound.

A further object of the invention is to provide an electromagnetic ball valve for flow medium under pressure which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

In the drawings:

The only FIGURE of the drawing is an axial sectional view of an electromagnetic ball valve for a respirator constructed in accordance with the invention.

DESCRIPTION OF THE PREFERRED EMBODIMENT

Referring to the drawing in particular the invention embodied therein includes an electromagnetic ball valve for a flow medium under pressure such as for controlling breathing gas in a respirator. The ball valve includes an outer sheath 1 of cylindrical form having an opening at each end and an upper and lower pole pieces 4 and 6 each having an axially aligned bore 8 and 9 are disposed within the sheath in spaced location so as to define a ball guideway 2 therebetween. The axial bore 8 includes an abutment 5 at its lower end and a seat 7 is defined at the upper end of the lower bore 9. A ball 3 is positioned between the abutment 5 and the seat 7. The guideway between the pole pieces 4 and 6 includes a space 11 around the ball which communicates with the bore 8 through a communicating passage 10. The ball 3 is movable 3 is movable in the guideway between the abutment 5 and the seat 7 under the control of respective electromagnetic coils 14 and 16 which are connected externally through a terminal 18.

In a sheath 1 a guideway 2 is machined, in which a ball 3 is guided. The ball 3 moves between an upper pole 4 with an abutment 5 and a lower pole 6 with a seat 7. In the upper pole 4 is provided the abutment 5 via an axial bore 8, and in the lower pole 6 the seat 7 with a similar lower bore 9 for the connection of the media to be conveyed. Pole 4 contains bores 10, which connect the upper bore 8 with a space 11, formed of partial spaces 12, connected by bores 13 in the guideway 2. Thus the upper pole 4 is always passing, while the lower pole 6 is tightly closed when the ball rests on the seat 7.

An upper magnet coil 14 is wound on an upper coil support 15, and a similar lower magnet coil 16 on a lower coil support 17. The terminals 18 to the magnet coils 14 and 16 are introduced into the upper coil support 15. The connection to the lower coil support 17 occurs through an insulating pipe 19.

The structural elements, ball 3, as well as coil supports 15, 17 with the magnet coils 14,16 and the poles 4,6 are held in the sheath 1 by flanges at 20. Seal rings 21, 22, 23, 24 separate the space 11 filled with the medium to be conveyed from the magnet coils 14 and 16.

Seal rings 25, 26 in fitting grooves 27 of sheath 1 permit the sealed installation of of the ball valve in an operating part (not shown).

The ball valve according to the invention permits its use both as an NC and as an NO valve. With a pressure side connection via the upper bore 8 it constitutes NC valve, with a pressure side connection via the lower bore 9, a NO valve.

The magnet coils 14,16 are controlled by a circuit in such a way that in any case the desired end position of the ball on seat 7 or on abutment 5 is obtained. Any remanences are effectively controlled out.

While a specific embodiment of the invention has been shown and described in detail to illustrate the application of the principles of the invention, it will be understood that the invention may be embodied otherwise without departing from such principles.

What is claimed is:

1. An electromagnetic ball valve for a flow medium under pressure, comprising an exterior cylindrical sheath having an opening at each end, an upper and a lower pole piece having aligned axial bores opened at each of their outer ends and being spaced apart at their inner ends arranged within said sheath, the inner ends being spaced apart to define a ball guideway therebetween, an abutment defined at the lower end of the upper pole piece axial bore and a seat defined at the upper end of the lower pole piece axial bore, a ball positioned in said guideway between said abutment and said seat, said guideway including a space around said ball, said upper pole bore having an always open communication passage connecting said bore to the space surrounding said ball, an upper and a lower magnet coil disposed around respective upper and lower poles, said ball being movable in said guideway between said seat and said abutment under the control of said coils.

2. An electromagnetic ball valve according to claim 1, wherein a space around said ball is sealed by sealing rings disposed between said upper and lower poles and said sheath, said sheath including a central portion extending between said upper and lower poles.

3. An electromagnetic ball valve according to claim 1, wherein said sheath includes a flange at each end engaged over a respective pole and having an exterior with readily inwardly extending grooves defined therein each groove containing a seal ring.

4. An electromagnetic ball valve according to claim 1, wherein said sheath includes an intermediate piece between said pole pieces extending substantially to said ball and including a plurality of bores defined in said piece communicating at the respective ends with said guideway, said upper and lower poles includes cutaway portions defining a partial space around the respective poles within said sheath.

* * * * *